US011374251B2

(12) United States Patent
Kim et al.

(10) Patent No.: US 11,374,251 B2
(45) Date of Patent: Jun. 28, 2022

(54) DEVICE AND METHOD FOR MOUNTING BATTERY CELL

(71) Applicant: LG Chem, Ltd., Seoul (KR)

(72) Inventors: Kyung-Mo Kim, Daejeon (KR); Jeong-O Mun, Daejeon (KR); Ho-June Chi, Daejeon (KR)

(73) Assignee: LG Energy Solution, Ltd.

( * ) Notice: Subject to any disclaimer, the term of this patent is extended or adjusted under 35 U.S.C. 154(b) by 218 days.

(21) Appl. No.: 16/766,572

(22) PCT Filed: Feb. 22, 2019

(86) PCT No.: PCT/KR2019/002245
§ 371 (c)(1),
(2) Date: May 22, 2020

(87) PCT Pub. No.: WO2019/231078
PCT Pub. Date: Dec. 5, 2019

(65) Prior Publication Data
US 2020/0373608 A1    Nov. 26, 2020

(30) Foreign Application Priority Data

May 30, 2018    (KR) .................. 10-2018-0061625

(51) Int. Cl.
*H01M 10/04* (2006.01)
*B29C 65/00* (2006.01)
(Continued)

(52) U.S. Cl.
CPC ... *H01M 10/0486* (2013.01); *B29C 66/83431* (2013.01); *H01M 50/209* (2021.01); *B29L 2031/3468* (2013.01)

(58) Field of Classification Search
CPC ...... B29C 66/83431; B29L 2031/3468; H01M 10/0486; H01M 50/204; H01M 50/209; H01M 50/244; Y02P 70/50
See application file for complete search history.

(56) References Cited

U.S. PATENT DOCUMENTS

2008/0294283 A1*  11/2008  Ligrano ................ B60L 53/52
                                                    700/218
2013/0004822 A1    1/2013  Hashimoto et al.
(Continued)

FOREIGN PATENT DOCUMENTS

JP    2012022937 A    2/2012
JP    2013098140 A    5/2013
(Continued)

OTHER PUBLICATIONS

Ntenational Search Report for Application No. PCT/KR2018/002245, dated Jun. 14, 2018, 2 pages.

*Primary Examiner* — Adam A Arciero
(74) *Attorney, Agent, or Firm* — Lerner, David, Littenberg, Krumholz & Mentlik, LLP

(57) ABSTRACT

An apparatus for mounting a battery cell mounts a battery cell stack to a frame that includes a base cover and a pair of side covers respectively extending from both ends of the base cover. The apparatus includes a support member to support the battery cell stack, a roller member around which a film fixed to the support member is wound, and a film guide member configured to move the film into the frame. When the film guide member moves the film into the frame, the support member and the frame move toward each other, and the battery cell stack is movable along the film to be mounted to the frame.

11 Claims, 10 Drawing Sheets

(51) Int. Cl.
*H01M 50/209* (2021.01)
*B29L 31/34* (2006.01)

(56) References Cited

U.S. PATENT DOCUMENTS

| | | | |
|---|---|---|---|
| 2013/0140099 A1* | 6/2013 | Ojima | B60L 53/80 |
| | | | 29/729 |
| 2014/0252363 A1 | 9/2014 | Liu et al. | |
| 2015/0064542 A1 | 3/2015 | Noh et al. | |
| 2016/0368464 A1* | 12/2016 | Hassounah | B60L 53/80 |

FOREIGN PATENT DOCUMENTS

| | | |
|---|---|---|
| JP | 5331490 B2 | 10/2013 |
| JP | 5623342 B2 | 11/2014 |
| JP | 2015050187 A | 3/2015 |
| JP | 2016096106 A | 5/2016 |
| KR | 20070047859 A | 5/2007 |
| KR | 100796621 B1 | 1/2008 |
| KR | 20090046436 A | 5/2009 |
| KR | 20120106088 A | 9/2012 |
| KR | 20130004141 A | 1/2013 |
| KR | 20130059764 A | 6/2013 |
| KR | 20140087780 A | 7/2014 |
| KR | 20140142548 A | 12/2014 |
| KR | 20150055255 A | 5/2015 |
| KR | 20160087584 A | 7/2016 |
| KR | 20160143903 A | 12/2016 |
| KR | 20170004028 U | 11/2017 |

* cited by examiner (a)

(b)

DEVICE AND METHOD FOR MOUNTING BATTERY CELL

CROSS-REFERENCE TO RELATED APPLICATIONS

The present application is a national phase entry under 35 U.S.C. § 371 of International Application No. PCT/KR2019/002245, filed Feb. 22, 2019, which claims priority to Korean Patent Application No. 10-2018-0061625 filed on May 30, 2018 in the Republic of Korea, the disclosures of which are incorporated herein by reference.

TECHNICAL FIELD

The present disclosure relates to an apparatus and method for mounting a battery cell, and more particularly, to an apparatus and method for mounting a battery cell, which allows a battery cell stack to be mounted to a frame without deforming the frame.

BACKGROUND ART

As technology development and demand for a mobile device have increased, demand for a secondary battery as an energy source has rapidly increased. Conventionally, a nickel-cadmium battery or a hydrogen ion battery has been used as the secondary battery. However, a lithium secondary battery is recently widely used because charging and discharging is free due to rare memory effect in comparison with a nickel-based secondary battery, a self-discharge rate is very low, and an energy density is high.

The lithium secondary battery mainly uses a lithium oxide and a carbonaceous material as a positive electrode active material and a negative electrode active material, respectively. The lithium secondary battery includes an electrode assembly in which a positive electrode plate and a negative electrode plate, respectively coated with the positive electrode active material and the negative electrode active material, are arranged with a separator therebetween, and an outer member, that is a battery case, which seals and receives the electrode assembly together with an electrolyte solution.

The lithium secondary battery includes a positive electrode, a negative electrode, a separator interposed therebetween, and an electrolyte. Depending on which material is used for the positive electrode active material and the negative electrode active material, the lithium secondary battery is classified into a lithium ion battery (LIB) and a polymer lithium ion battery (PLIB). Generally, an electrode of the lithium secondary battery is prepared by applying the positive or negative electrode active material to a current collector made of aluminum or copper sheet, mesh, film, foil, or the like and then drying the same.

In a secondary battery, a battery cell stack may be mounted to frames of various shapes. Here, if the frame has a U shape, it is not easy to mount the battery cell stack to the frame.

FIGS. 1(a) and 1(b) are diagrams for illustrating a method of inserting a battery cell stack into a U-shaped frame.

Referring to FIG. 1(a), an inner length L1 of the U-shaped frame 1 is identical or extremely similar to an entire length L2 of a battery cell stack 2, and namely, there is substantially no clearance. Here, the battery cell stack 2 is inserted into the U-shaped frame 1 in a state where a side cover 4 of the frame 1 is deformed to spread outward by applying an external force to the side cover 4 of the U-shaped frame 1 outward. However, in this method, the U-shaped frame 1 may be permanently deformed, and the U-shaped frame 1 may be distorted.

Referring to FIG. 1(b), since the inner length L1 of the U-shaped frame 1 is longer than the entire length L2 of the battery cell stack 2, a predetermined space 5 is formed between the U-shaped frame 1 and the battery cell stack 2. By doing so, the battery cell stack 2 may be easily mounted to the U-shaped frame 1. However, due to the space 5 between the U-shaped frame 1 and the battery cell stack 2, it is not easy to fix the battery cell stack 2 to the U-shaped frame 1, and the space utilization of the battery module is low since the total volume of the battery module increases.

DISCLOSURE

Technical Problem

The present disclosure is designed to solve the problems of the related art, and therefore the present disclosure is directed to providing an apparatus and method for mounting a battery cell, which may allow a battery cell stack to be mounted to a frame without deforming or distorting the frame.

Also, the present disclosure is directed to providing an apparatus and method for mounting a battery cell, which may prevent the space utilization of the battery from deteriorating.

In addition, the present disclosure is directed to providing an apparatus and method for mounting a battery cell, which may allow the battery cell stack to be mounted to the frame without damaging the battery cell stack.

Technical Solution

In one aspect of the present disclosure, there is provided an apparatus for mounting a battery cell, which mounts a battery cell stack to a frame that includes a base cover and a pair of side covers respectively extending from both ends of the base cover, the apparatus comprising: a support member to support the battery cell stack; a roller member around which a film fixed to the support member is wound; and a film guide member configured to move the film into the frame, wherein, when the film guide member moves the film into the frame, the support member and the frame move toward each other, and the battery cell stack is movable along the film to be mounted to the frame.

Also, the support member may include: a first support portion to support the battery cell stack; and a second support portion formed longer than the first support portion and coupled to both ends of the first support portion, the film being fixed to the second support portion.

In addition, when the apparatus is in use, the film guide member may be disposed so that the film is located between the frame and the film guide member, and the film guide member may contact the film and move the film into the frame.

Also, the apparatus may further comprise a pressing member configured to move toward the support member at a position spaced apart from the support member to press one of two side surfaces of the battery cell stack.

In addition, the pressing member may include: a movable rod; at least one rotating roller coupled to the movable rod and configured to contact the film at one of the side surfaces of the battery cell stack; and a driving force transmission source coupled to the movable rod to transmit a driving force to the movable rod.

Also, the apparatus may further comprise a film damage prevention member disposed to be movable between the frame and the roller member and configured to move toward the film and contact the film.

In addition, a round portion may be formed at an edge of the film damage prevention member at which the film damage prevention member contacts the film.

Also, the apparatus may further comprise a heat conduction member couplable to the battery cell stack.

Meanwhile, in another aspect of the present disclosure, there is also provided a method for mounting a battery cell, which mounts a battery cell stack to a frame that includes a base cover and a pair of side covers respectively extending from both ends of the base cover, the method comprising: providing a battery cell stack to be supported by a support member; by a film guide member, moving a film fixed to the support member and wound around a roller member into the frame; moving the support member and the frame toward each other; moving the battery cell stack along the film to be inserted into the frame; removing the film guide member from the film; and drawing the film from the inside of the frame by rotating the roller member.

Also, the method may further comprise moving a pressing member toward the support member at a position spaced apart from the support member to press a side surface of the battery cell stack.

In addition, the method may further comprise moving a film damage prevention member toward the film to contact the film.

Advantageous Effects

In embodiments of the present disclosure, since the battery cell stack is mounted to the frame along a film, the battery cell stack may be mounted to the frame without deforming or distorting the frame.

Also, since no space is formed between the frame and the battery cell stack, it is possible to prevent the space utilization of the battery from deteriorating.

In addition, since the battery cell stack is inserted into the frame while sliding along the film, the battery cell stack may be mounted to the frame without being damaged.

BEST MODE

Figure 1:
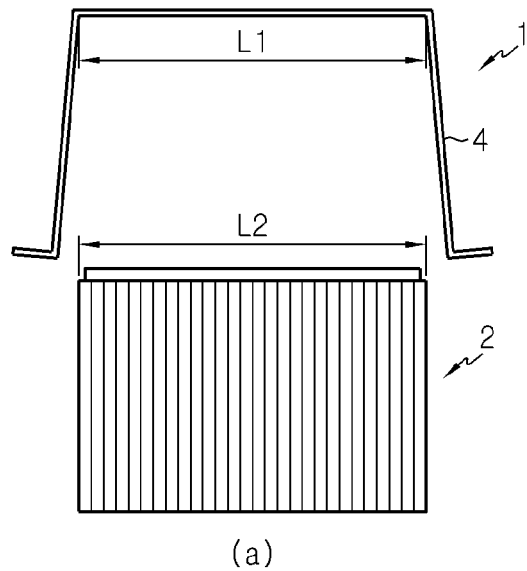
FIGS. 1(a) and 1(b) are diagrams for illustrating a method of inserting a battery cell stack into a U-shaped frame.
Figure 1:
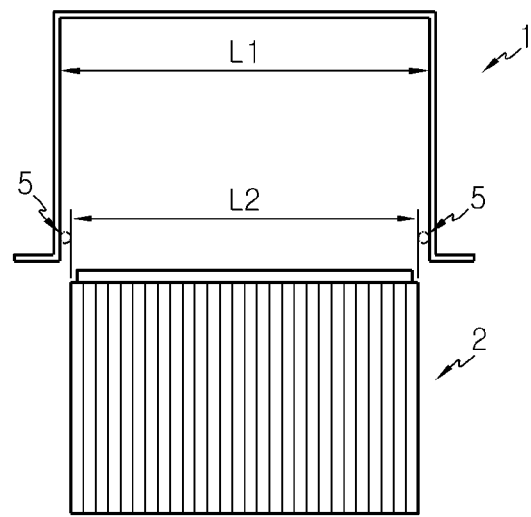

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the drawings, the size of each element or a specific part of the element may be exaggerated, omitted, or schematically illustrated for convenience and clarity of a description. Thus, the size of each element does not entirely reflect the actual size of the element. A detailed description of well-known functions or elements associated with the present disclosure will be omitted if it unnecessarily obscures the subject matter of the present disclosure.

The term, 'combine' or 'connect' as used herein, may refer not only to a case where one member and another member are directly combined or directly connected but also a case where one member is indirectly combined with another member via a connecting member or is indirectly connected.

Figure 2:
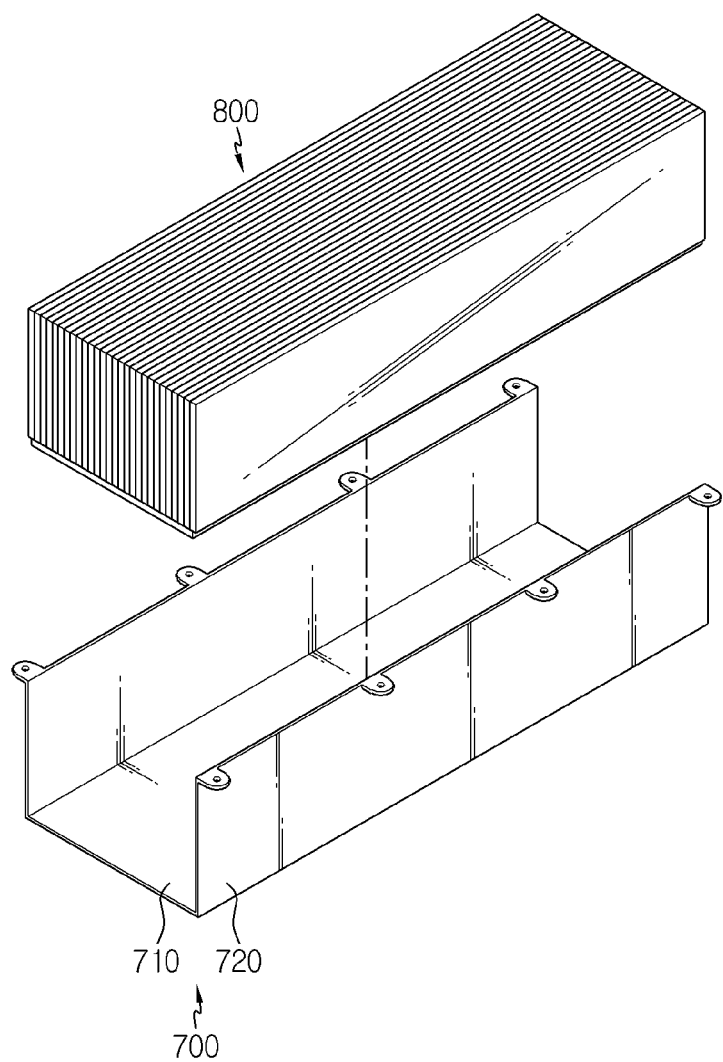
FIG. 2 is a schematic perspective view showing that a battery cell stack is separated from a frame.
Figure 3:
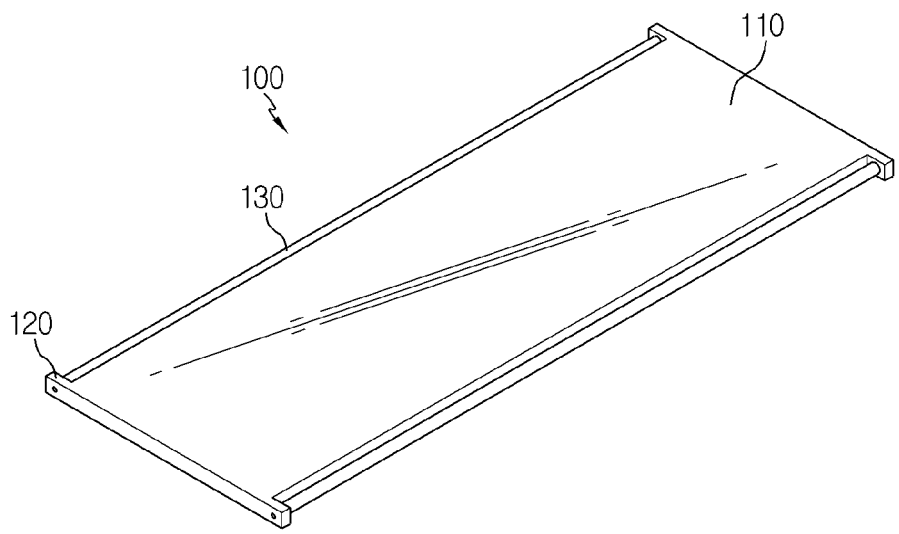
FIG. 3 is a schematic perspective view showing a support member in an apparatus for mounting a battery cell according to an embodiment of the present disclosure.
Figure 4:
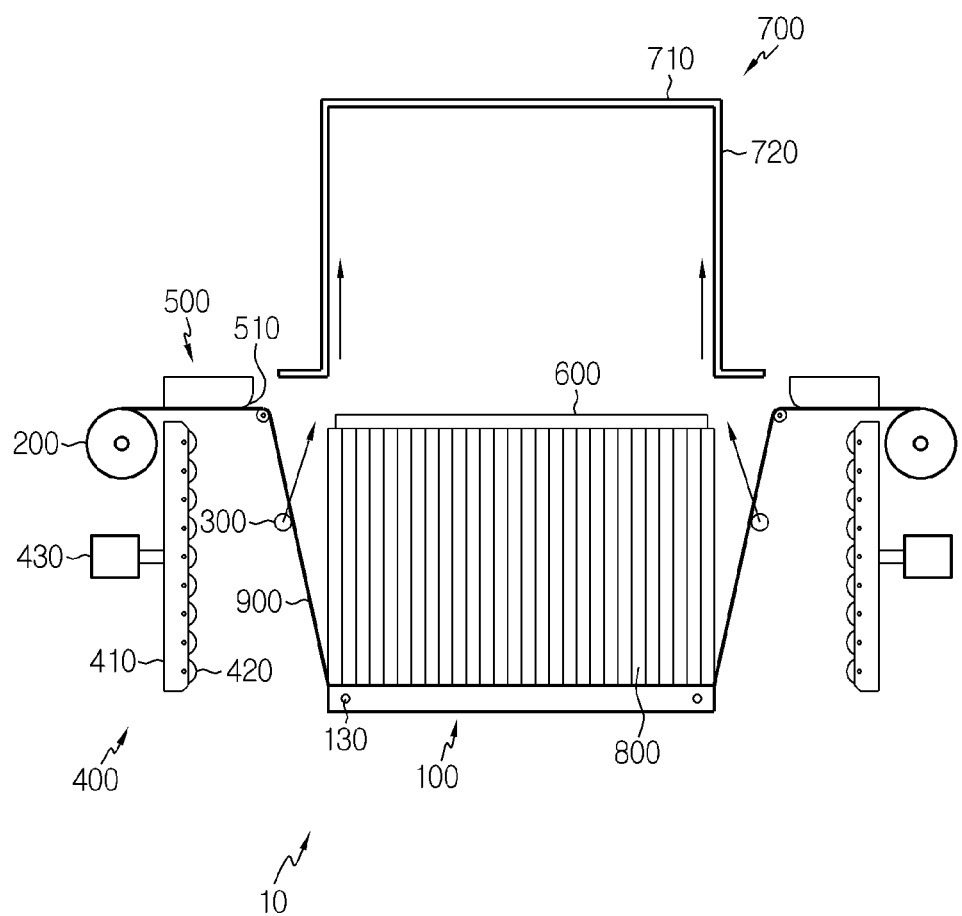
FIG. 4 is a schematic side view showing the apparatus for mounting a battery cell according to an embodiment of the present disclosure.
Figure 10:
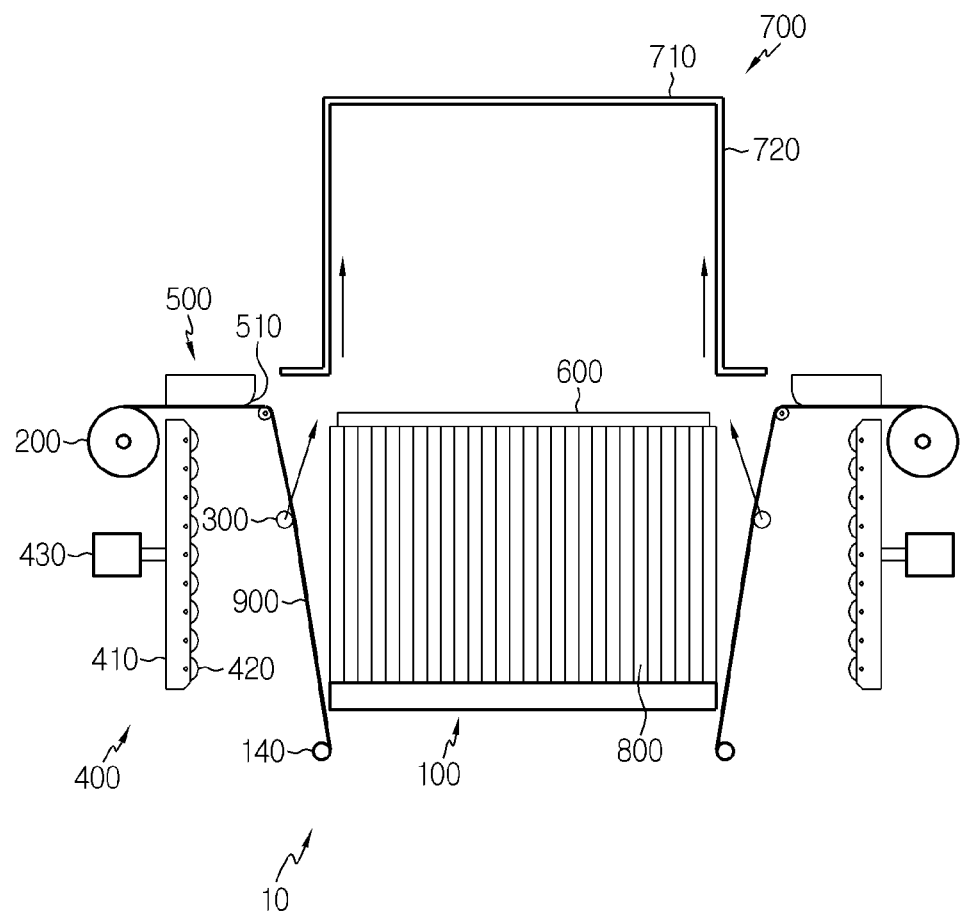
FIG. 10 is a schematic side view showing an apparatus for mounting a battery cell according to another embodiment of the present disclosure.

FIG. 2 is a schematic perspective view showing that a battery cell stack is separated from a frame, FIG. 3 is a schematic perspective view showing a support member in an apparatus for mounting a battery cell according to an embodiment of the present disclosure, FIG. 4 is a schematic side view showing the apparatus for mounting a battery cell according to an embodiment of the present disclosure, and FIG. 10 is a schematic side view showing an apparatus for mounting a battery cell according to another embodiment of the present disclosure.

In this specification, a battery cell stack 800 may be mounted to a frame 700 to form a battery module. The frame 700 may have various shapes, and for convenience of explanation, as shown in FIG. 2, the frame 700 will be described as including a base cover 710 and a pair of side covers 720 extending from both ends of the base cover 710. For example, the frame 700 may be formed to have an approximate "U" shape. Here, the approximate "U" shape does not necessarily have to be the same as the "U" shape but includes all shapes similar to the "U" shape.

Referring to FIG. 4, an apparatus 10 for mounting a battery cell according to an embodiment of the present disclosure includes a support member 100, a roller member 200 and a film guide member 300.

The support member 100 supports the battery cell stack 800. That is, referring to FIG. 4, the battery cell stack 800 may be placed on and supported by an upper side of the support member 100. In addition, one side of a film 900, explained later, may be fixed to the support member 100. The support member 100 may move close to the frame 700. That is, the support member 100 may move toward the frame 700 in a state where the battery cell stack 800 is placed thereon, or the frame 700 may move toward the support member 100. In this regard, a predetermined power source may be coupled to the support member 100 to move the support member 100 toward the frame 700. Alternatively, the support member 100 may be fixed and the frame 700 may be moved to the support member 100. However, for convenience of explanation, the following description will be based on the case where the support member 100 moves toward the frame 700.

The support member 100 may include a first support portion 110 and a second support portion 120. Referring to FIGS. 3 and 4 together, the battery cell stack 800 is placed on the first support portion 110. Here, the battery cell stack 800 may be prepared by coupling a plurality of battery cells in various ways. For example, a plurality of battery cells may be attached to each other by a double-sided tape to form the battery cell stack 800, and the battery cell stack 800 configured as above is placed on an upper side of the first support portion 110 based on FIG. 4. The second support portion 120 is formed longer than the first support portion 110 and is coupled to both ends of the first support portion 110. Here, the second support portion 120 may be integrally formed with the first support portion 110, or may be manufactured separately and then coupled to an end portion of the first support portion 110 in various ways. A fixed bar 130 may be respectively coupled to two second support portions 120 as shown in FIGS. 3 and 4, and the film 900 may be fixed to the fixed bar 130. Here, both ends of some of the battery cells of the battery cell stack 800 may be placed on and supported by the second support portion 120.

The roller member 200 is wound with the film 900 fixed to the support member 100. Referring to FIGS. 3 and 4, one side of the film 900 may be fixed to the fixed bar 130 coupled to the second support portion 120 of the support member 100, and the other side of the film 900 may be wound on the roller member 200 so as to be wound or unwound. Alternatively, as another embodiment, referring to FIG. 10, one side of the film 900 may be fixed to a fixing member 140 disposed apart from the support member 100, and the other side of the film 900 may be wound on the roller member 200 so as to be wound or unwound. The roller member 200 is provided to be rotatable, and the film 900 may be wound on the roller member 200 or unwound from the roller member 200 in accordance with the counterclockwise or clockwise rotation of the roller member 200.

The film guide member 300 moves in contact with the film 900 wound on the roller member 200 and moves the film 900 into the frame 700. Referring to FIG. 4, the film guide member 300 is disposed so that the film 900 is positioned between the frame 700 and the film guide member 300. That is, based on FIG. 4, the film guide member 300 is disposed at a lower side of the film 900, and the film guide member 300 moves upward to contact the film 900 and moves toward the frame 700 together with the film 900. In addition, the film guide member 300 moves the film 900 into the frame 700. At this time, the film 900 may be unwound from the roller member 200 and move into the frame 700 together with the film guide member 300. In addition, if the film 900 is inserted to a predetermined position inside the frame 700, the support member 100 moves toward the frame 700 in a state where the battery cell stack 800 is placed on the support member 100. In addition, the battery cell stack 800 placed on the support member 100 may move along the film 900 toward the frame 700 and be mounted to the frame 700.

The pressing member 400 moves toward the support member 100 at a position spaced apart from the support member 100 to press a side surface of the battery cell stack 800. That is, the pressing member 400 presses the side surface of the battery cell stack 800 so that the battery cell stack 800 is smoothly inserted into the frame 700.

The pressing member 400 may include a movable rod 410, a rotating roller 420 and a driving force transmission source 430. The movable rod 410 contacts the side surface of the battery cell stack 800 via roller 420 and presses the battery cell stack 800 (see FIG. 5). To this end, the movable rod 410 may have a height corresponding to the height of the battery cell stack 800 based on the direction in which the battery cell stack 800 is supported by the support member 100. That is, the movable rod 410 may be provided to have a length equal to the height of the battery cell stack 800, without being limited thereto. In addition, the movable rod 410 is provided to be movable toward the battery cell stack 800 at a position spaced apart from the battery cell stack 800. At least one rotating roller 420 is provided to be coupled to the movable rod 410. In addition, if the film 900 moves toward the frame 700 by the film guide member 300 to contacts the side surface of the battery cell stack 800, the rotating roller 420 contacts the film 900 at the side surface of the battery cell stack 800. In addition, if the film 900 is moved toward the frame 700 in a state where the battery cell stack 800 is pressed together with the film 900, the rotating roller 420 rotates in association with the movement of the film 900. By doing so, the frictional force between the pressing member 400 and the film 900 may be relaxed. The driving force transmission source 430 is coupled to the movable rod 410 to transmit a driving force to the movable rod 410. The movable rod 410 may be moved toward the battery cell stack 800 or away from the battery cell stack 800 by the driving force transmitted from the driving force transmission source 430. Here, the driving force transmission source 430 may be provided in various ways and may include various motors or cylinders, for example.

A film damage prevention member 500 is movably disposed between the frame 700 and the roller member 200 and may be provided to move toward the film 900 and contact the film 900. The film damage prevention member 500 is provided to be movable toward the film 900. Since the film damage prevention member 500 moves in the same way as the movable rod 410 of the pressing member 400 described above, the moving mechanism of the film damage prevention member 500 will not be described again. That is, the film damage prevention member 500 may also be provided to move with a power received from a motor, a cylinder, or the like. However, the moving mechanism of the film damage prevention member 500 does not have to be identical to the moving mechanism of the movable rod 410 of the pressing member 400, and the film damage prevention member 500 may be moved by in another driving method.

The film damage prevention member 500 may have a round portion 510 formed at an edge thereof. If the film damage prevention member 500 is not provided, the film 900 may be torn due to sharp edges of the frame 700. To prevent this, the film damage prevention member 500 has the rounded portion 510 formed at the edge thereof. Since the film 900 contacts the rounded portion 510 at the edge of the film damage prevention member 500, the film 900 is prevented from being torn even though the film 900 is inserted into the frame 700. The film damage prevention member 500 may have elasticity and, for example, may be made of various composite resin materials, without being limited thereto.

A heat conduction member 600 may be coupled to the battery cell stack 800. Referring to FIG. 4, for example, the heat conduction member 600 may be coupled to the upper side of the battery cell stack 800 based on FIG. 4. If heat conduction member 600 is mounted to the battery cell stack 800, the heat conduction member 600 may be interposed between the frame 700 and the battery cell stack 800. That is, since there is no need to separately mount the heat conduction member 600, the assembling work becomes easy and the assembling process is simplified. Here, the heat conduction member 600 may include various members capable of discharging the heat generated at the battery cell stack 800, and includes various heat dissipating members.

FIGS. 5 to 9 are diagrams for illustrating a process of mounting the battery cell stack to the frame by the apparatus for mounting a battery cell according to an embodiment of the present disclosure.

Hereinafter, a method for mounting a battery cell according an embodiment of the present disclosure will be described with reference to the figures.

As described above, the frame 700 to which the battery cell stack 800 is mounted will be described as including a base cover 710 and a pair of side covers 720 respectively extending from both ends of the base cover 710.

First, referring to FIGS. 3 and 4, the battery cell stack 800 is placed on and supported by the upper side of the first support portion 110 of the support member 100. Here, the second support portion 120 is coupled to the first support portion 110, and the film 900 is fixed to the fixed bar 130 coupled to the second support portion 120.

Next, the film guide member 300 contacts the film 900 to move the film 900 into the frame 700. Here, one side of the film 900 is fixed to the fixed bar 130 coupled to the second support portion 120 of the support member 100, and the other side of the film 900 is wound on the roller member 200 to be wound or unwound. Here, as in FIG. 4, if the film guide member 300 moves upward from the lower side of the film 900 based on FIG. 4, the film guide member 300 contacts the film 900 so that the film guide member 300 moves together with the film 900 toward the frame 700, and the roller member 200 rotates in a direction along which the film 900 is unwound.

Figure 5:
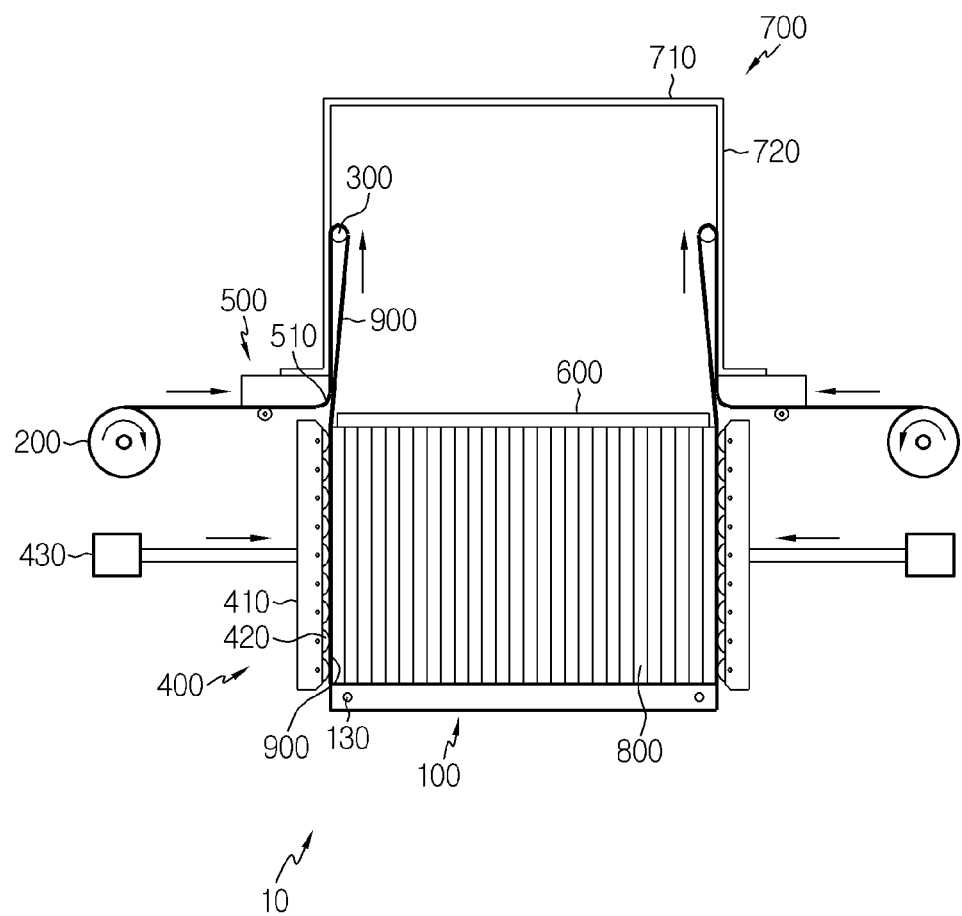
FIGS. 5 to 9 are diagrams for illustrating a process of mounting the battery cell stack to the frame by the apparatus for mounting a battery cell according to an embodiment of the present disclosure.

Next, referring to FIG. 5, the movable rod 410 coupled to the driving force transmission source 430 of the pressing member 400 moves toward the support member 100 at a position spaced apart from the support member 100, so that the rotating roller 420 of the pressing member 400 presses the side surface of the battery cell stack 800 together with the film 900, and the film damage prevention member 500 moves toward the film 900 so that the film 900 contacts the round portion 510 formed at the edge of the film damage prevention member 500. As the pressing member 400 presses the side surface of the battery cell stack 800, the battery cell stack 800 may be smoothly inserted into the frame 700, and the rounded portion 510 formed at the edge of the film damage prevention member 500 may prevent the film 900 from being torn when the film 900 is inserted. In addition, the film guide member 300 continuously moves the film 900 inside the frame 700 until it reaches a predetermined position.

Figure 6:
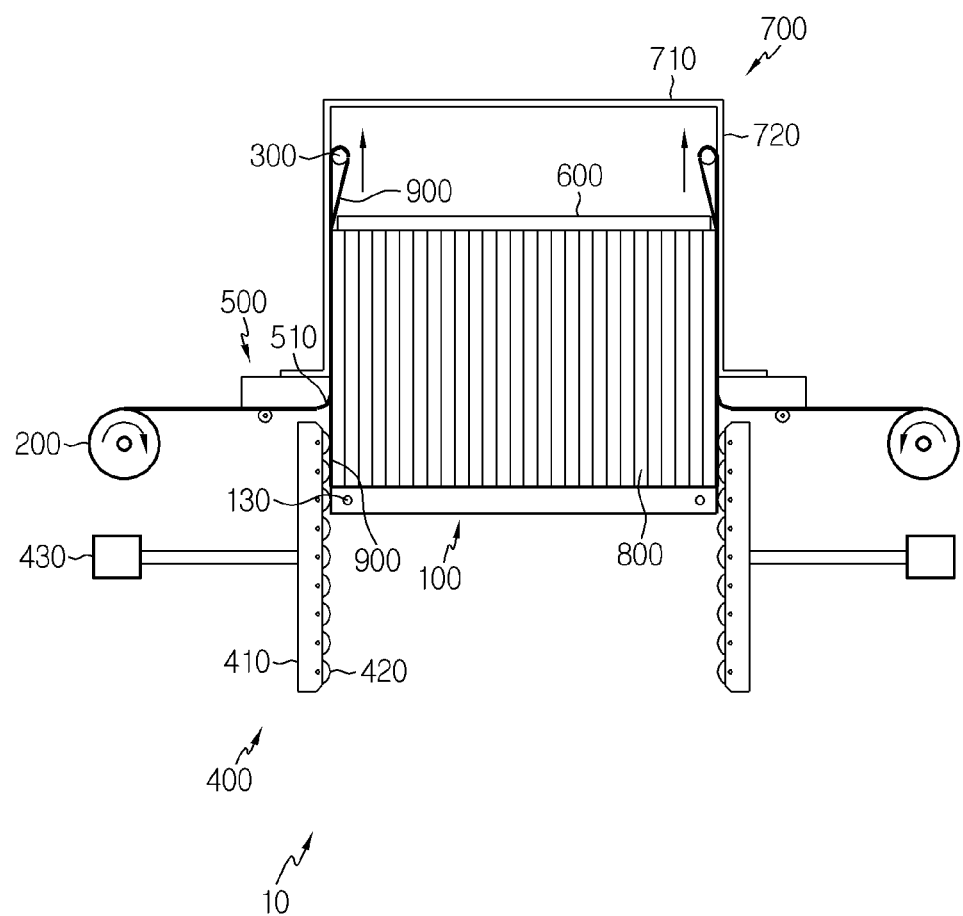

Next, referring to FIG. 6, if the film guide member 300 and the film 900 reach a predetermined position inside the frame 700, the support member 100 and the frame 700 come close to each other. That is, the support member 100 moves toward the frame 700.

Next, if the support member 100 moves toward the frame 700, the battery cell stack 800 placed on the support member 100 moves along the film 900 to be inserted into the frame 700. Here, since the battery cell stack 800 is smoothly inserted into the frame 700 while sliding along the film 900 having a low coefficient of friction, the battery cell stack 800 may be mounted on the frame 700 without being damaged.

Figure 7:
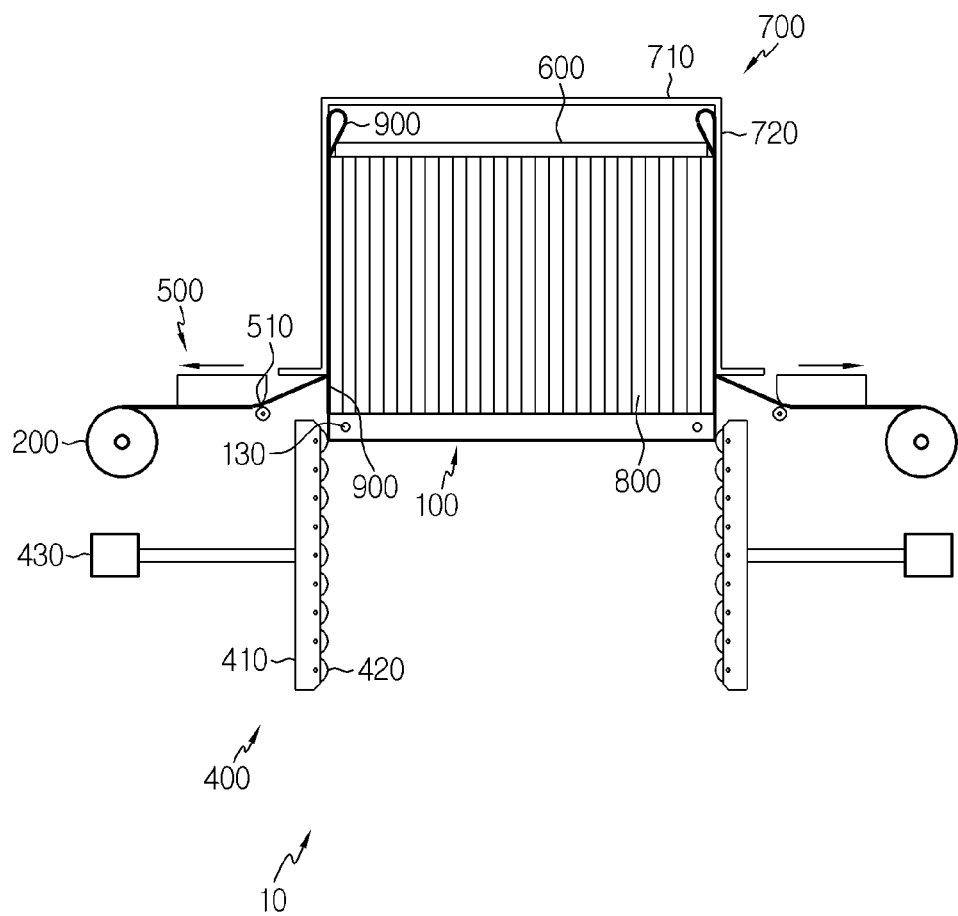

Next, referring to FIG. 7, if the battery cell stack 800 is inserted to a predetermined position inside the frame 700, the film guide member 300 is removed from the film 900.

Referring to FIG. 2, the frame 700 includes the base cover 710 and the side cover 720, but the front and rear sides of the base cover 710 are open, so that the film guide member 300 may be removed from the film 900 through the front or rear side of the frame 700.

Figure 8:
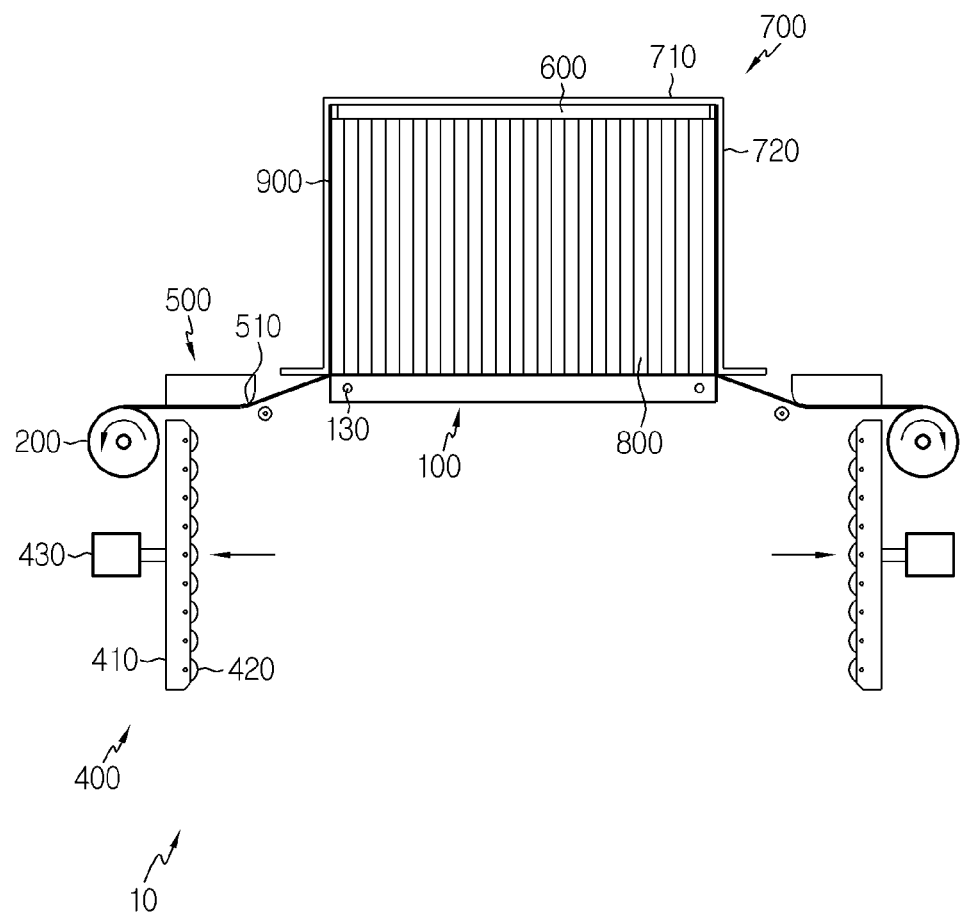

Next, referring to FIG. 8, after the film guide member 300 is removed from the film 900, the battery cell stack 800 slides along the film 900 and is completely inserted into the frame 700.

Figure 9:
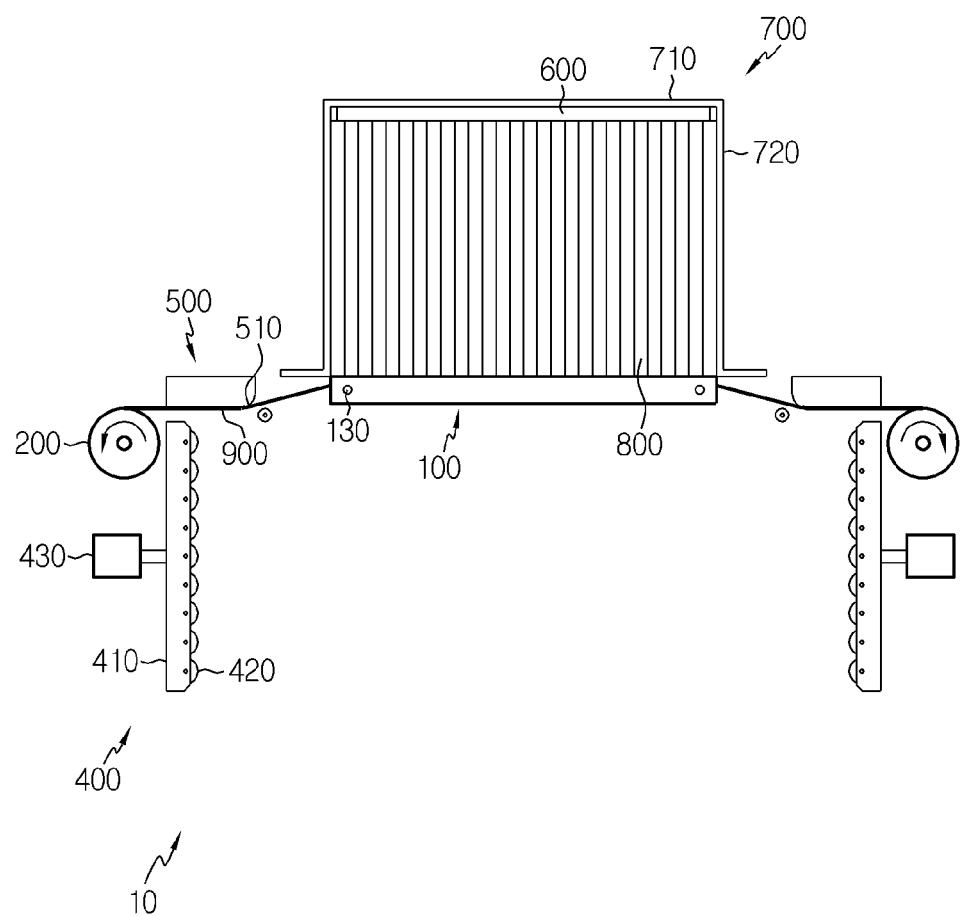

Next, referring to FIG. 9, the roller member 200 rotates in a direction along which the film 900 is wound on the roller member 200, and thus the film 900 is drawn out from the inside of the frame 700.

In this manner, the battery cell stack 800 may be mounted to the frame 700 without any deformation or distortion of the frame 700. Also, since no space is formed between the frame 700 and the battery cell stack 800, it is possible to prevent the space utilization of the battery from deteriorating. In addition, since the battery cell stack 800 is inserted into the frame 700 while sliding along the film 900, the battery cell stack 800 may be mounted to the frame 700 without damaging the battery cell stack 800.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

The present disclosure relates to apparatus and method for mounting a battery cell and is particularly applicable to an industry related to a secondary battery.

What is claimed is:

1. An apparatus for mounting a battery cell, which mounts a battery cell stack to a frame that includes a base cover and a pair of side covers respectively extending from both ends of the base cover, the apparatus comprising:
a support member to support the battery cell stack;
a roller member around which a film fixed to the support member is wound; and
a film guide member configured to move the film into the frame,
wherein, when the film guide member moves the film into the frame, the support member and the frame move toward each other, and the battery cell stack is movable along the film to be mounted to the frame.

2. The apparatus for mounting a battery cell according to claim 1,
wherein the support member includes:
a first support portion to support the battery cell stack; and
a second support portion formed longer than the first support portion and coupled to both ends of the first support portion, the film being fixed to the second support portion.

3. The apparatus for mounting a battery cell according to claim 1,
wherein, when the apparatus is in use, the film guide member is disposed so that the film is located between the frame and the film guide member, and the film guide member contacts the film and moves the film into the frame.

4. The apparatus for mounting a battery cell according to claim 1, further comprising:

a pressing member configured to move toward the support member at a position spaced apart from the support member to press one of two side surfaces of the battery cell stack.

5. The apparatus for mounting a battery cell according to claim 4,
wherein the pressing member includes:
a movable rod;
at least one rotating roller coupled to the movable rod and configured to contact the film at one of the side surfaces of the battery cell stack; and
a driving force transmission source coupled to the movable rod to transmit a driving force to the movable rod.

6. The apparatus for mounting a battery cell according to claim 1, further comprising:
a film damage prevention member disposed to be movable between the frame and the roller member and configured to move toward the film and contact the film.

7. The apparatus for mounting a battery cell according to claim 6,
wherein a round portion is formed at an edge of the film damage prevention member at which the film damage prevention member contacts the film.

8. The apparatus for mounting a battery cell according to claim 1, further comprising:
a heat conduction member couplable to the battery cell stack.

9. A method for mounting a battery cell, which mounts a battery cell stack to a frame that includes a base cover and a pair of side covers respectively extending from both ends of the base cover, the method comprising:
providing a battery cell stack to be supported by a support member;
by a film guide member, moving a film fixed to the support member and wound around a roller member into the frame;
moving the support member and the frame toward each other;
moving the battery cell stack along the film to be inserted into the frame;
removing the film guide member from the film; and
drawing the film from the inside of the frame rotating the roller member.

10. The method for mounting a battery cell according to claim 9, further comprising:
moving a pressing member toward the support member at a position spaced apart from the support member to press a side surface of the battery cell stack.

11. The method for mounting a battery cell according to claim 9, further comprising:
moving a film damage prevention member toward the film to contact the film.

* * * * *